United States Patent
Nareid et al.

(10) Patent No.: US 6,971,345 B2
(45) Date of Patent: Dec. 6, 2005

(54) CONTROL OF A MECHANICAL ACTUATOR USING A MODULAR MAP PROCESSOR

(75) Inventors: Helge Nareid, Aberdeen (GB); Neil Lightowler, Aberdeen (GB)

(73) Assignee: Axeon Limited, Aberdeen (GB)

( * ) Notice: Subject to any disclaimer, the term of this patent is extended or adjusted under 35 U.S.C. 154(b) by 0 days.

(21) Appl. No.: 10/376,074

(22) Filed: Feb. 27, 2003

(65) Prior Publication Data

US 2003/0167095 A1   Sep. 4, 2003

(30) Foreign Application Priority Data

Mar. 1, 2002   (GB) .................................... 0204826

(51) Int. Cl.[7] ................................................ F01L 9/04
(52) U.S. Cl. .................. 123/90.11; 123/90.03; 701/115
(58) Field of Search .................... 123/90.11–90.16, 123/90.03; 701/115

(56) References Cited

U.S. PATENT DOCUMENTS

| | | | | | |
|---|---|---|---|---|---|
| 4,250,842 A | * | 2/1981 | Sutton | ........................ | 123/472 |
| 5,351,985 A | * | 10/1994 | Ando et al. | ................. | 280/5.52 |
| 6,055,476 A | * | 4/2000 | Yoshino | ..................... | 701/110 |
| 6,407,848 B1 | * | 6/2002 | Bablumyan et al. | ........ | 359/279 |
| 6,668,214 B2 | * | 12/2003 | Yasui et al. | .................. | 700/282 |
| 6,729,277 B2 | * | 5/2004 | Yamaki et al. | ........... | 123/90.11 |

FOREIGN PATENT DOCUMENTS

WO   WO 00/45333   3/2000

* cited by examiner

*Primary Examiner*—John T. Kwon
(74) *Attorney, Agent, or Firm*—Drinker Biddle & Reath LLP

(57) ABSTRACT

A method of controlling a mechanical actuator using a modular map processor comprises monitoring a plurality of parameters associated with the actuator. The modular map processor generates a control signal based on the parameters for output to the actuator and modifies the control signal based on a merit function. In preferred forms the mechanical actuator is an input or output valve in a cylinder for an internal combustion engine.

6 Claims, 4 Drawing Sheets

Block diagram for the application example, control of an electrohydraulic cylinder valve

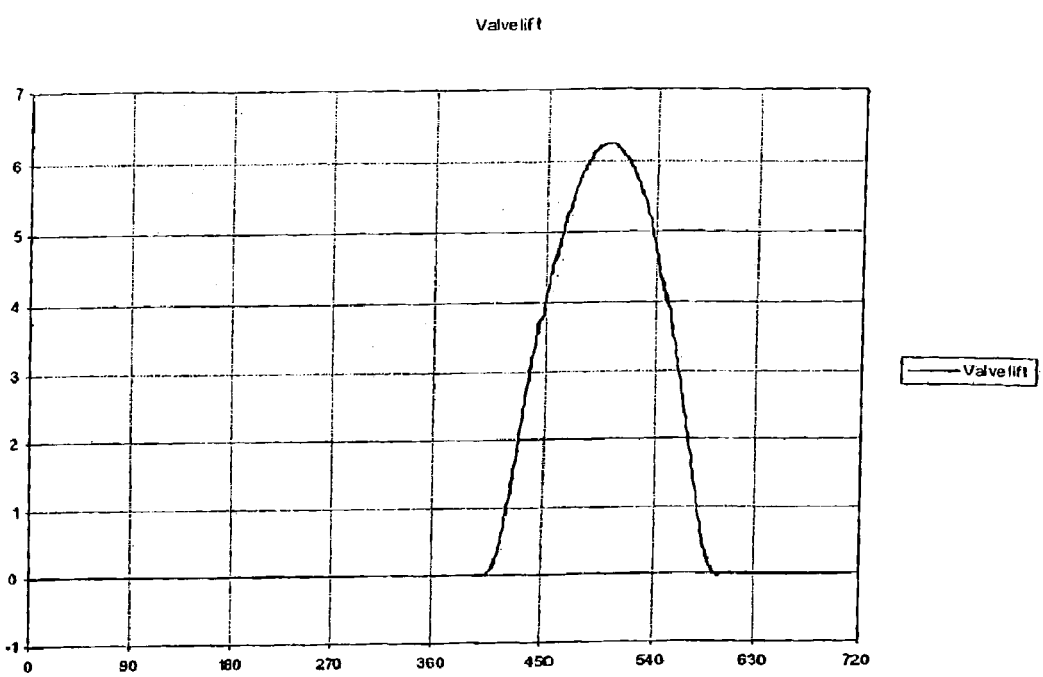
Figure 1  Typical cylinder valve profile for a valve cycle of two revolutions (720°)

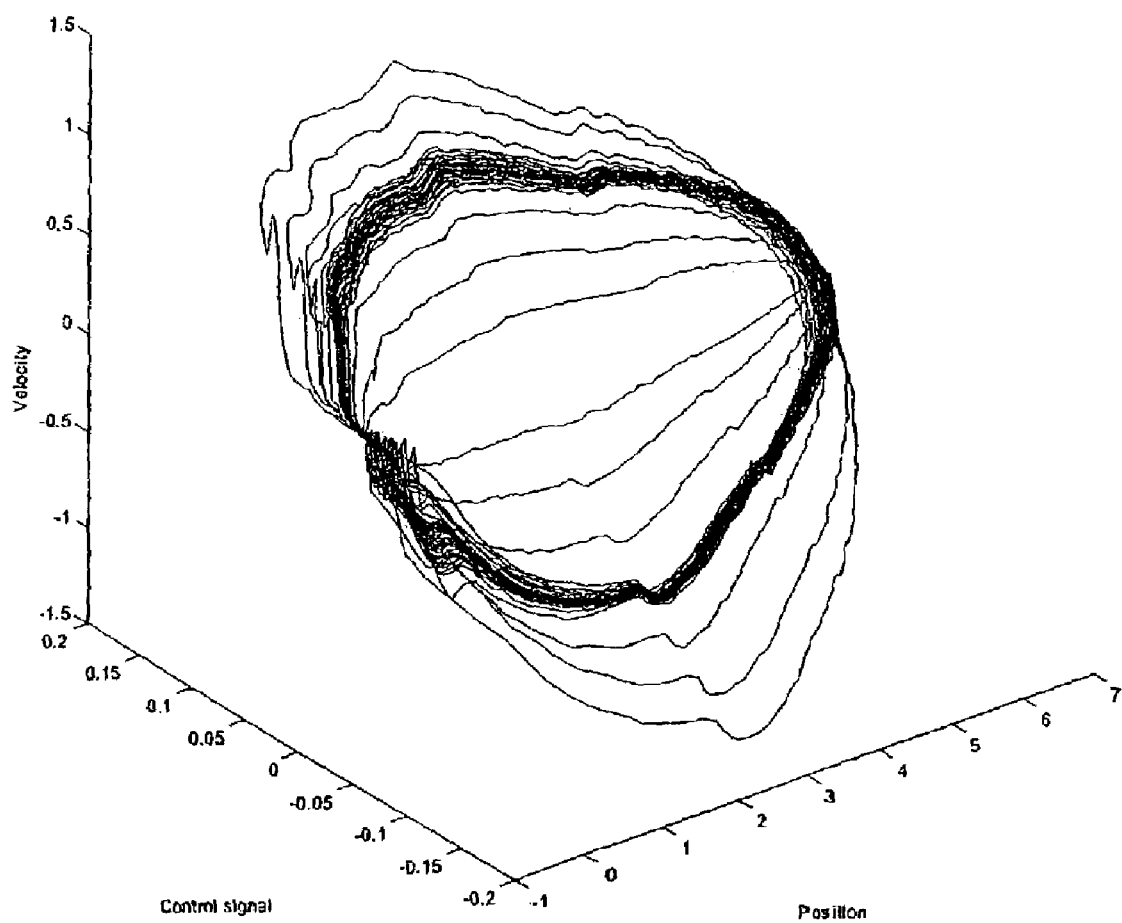
Figure 2 Operational space of electrohydraulic valve actuator

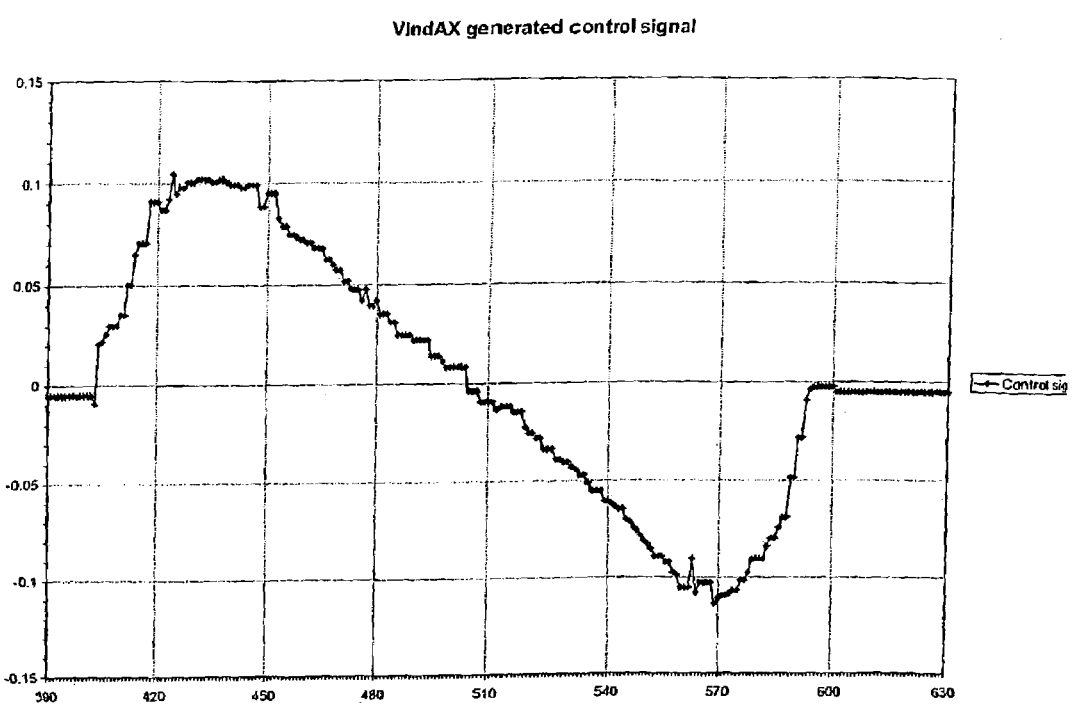
Figure 3  Simulated control signal generated by modular map

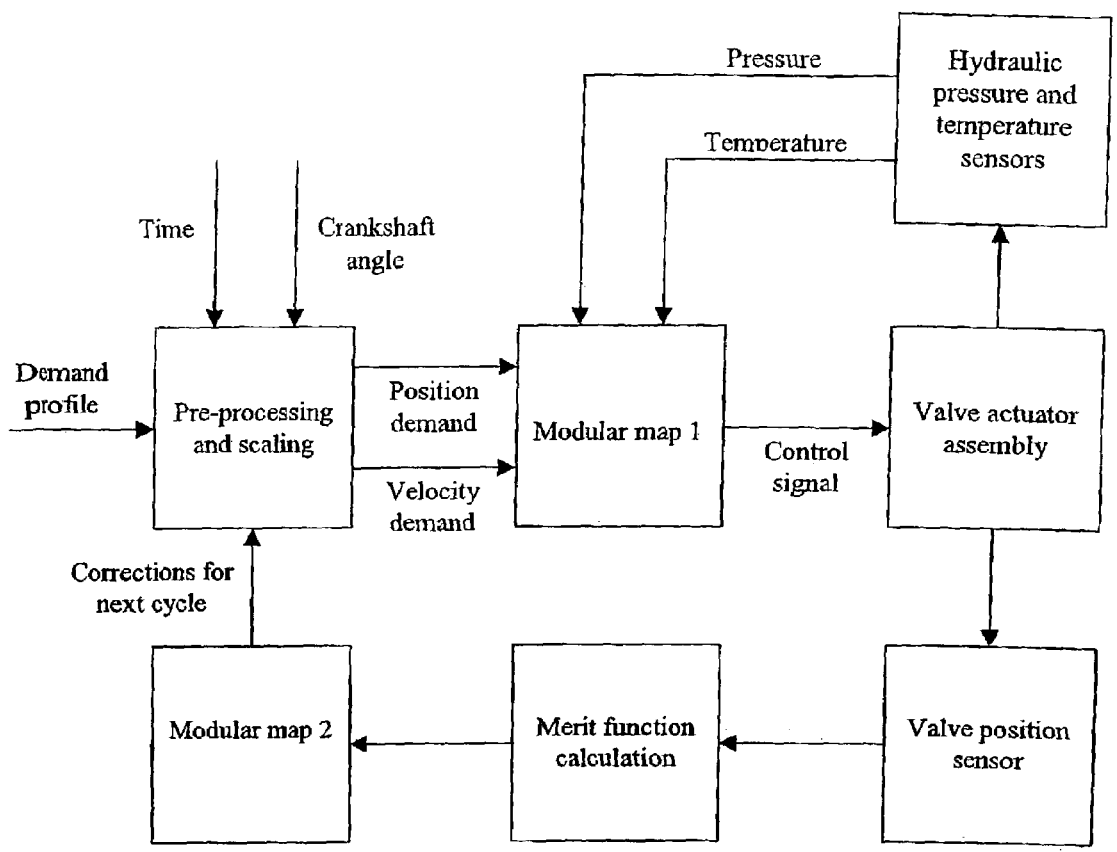
Figure 4  Block diagram for the application example, control of an electrohydraulic cylinder valve

CONTROL OF A MECHANICAL ACTUATOR USING A MODULAR MAP PROCESSOR

FIELD OF THE INVENTION

The invention relates to a control system for an electronically controlled mechanical actuator.

SUMMARY OF THE INVENTION

According to the invention there is provided a method of controlling a mechanical actuator comprising monitoring a plurality of parameters relating to the actuator and the system associated with the actuator and using a modular map processor to control the actuator.

Further according to the present invention there is provided apparatus to carrying out the methods in the preceding paragraph.

BRIEF DESCRIPTION OF THE DRAWINGS

Embodiments of the present invention will now be described, by way of example only, with reference to the accompanying drawings, in which:

FIG. 1 is a typical valve profile for a valve cycle of two revolutions (i.e., 720 degrees);

FIG. 2 is a chart illustrating the operational space of an electrohydraulic valve actuator according to the present invention;

FIG. 3 is a chart illustrating a simulated control signal generates by a modular map according to the present invention; and FIG. 4 is a block diagram illustrating one embodiment of a control system for an electrohydraulic cylinder valve according to the present invention.

DETAILED DESCRIPTION OF THE INVENTION

The system is used to control an electrohydraulic actuator, in this case a cylinder input or output valve for an internal combustion engine, but the principle is also suitable for other kinds of actuators, such as electromechanical actuators, and for actuators used in other applications.

The system uses two instances of a hardware implementation of a modular map. These two instances may or may not use the same physical chip. The first instance is used to generate a control signal for the actuator in real time, based on a mapping of the non-linear characteristics of the actuator. The second instance is used for evaluating a "merit function" for the actuator and providing suitable feedback to the first instance of the modular map.

The first instance of the modular map is used for generation of the actuator control signal. The exact nature of this signal is dependant on the actual construction of the actuator, possible types of control signal may be (but are not limited to) electric voltages or currents. The input to the modular map is the desired actuator response, as well as other parameters which influence the actuator response.

The modular map utilises a mapping of the non-linear transfer function of the actuator to the modular map. In order to achieve this mapping, three types of data are required, these are:

Desired actuator response

Actuator control signal

Environmental and operational parameters which influence actuator response. Operational parameters can for example be related to current actuator state (such as actuator position). Environmental parameters can be any parameters external to the actuator itself which influence actuator performance, such as temperature. Particular emphasis should be placed on parameters which display strong non-linear influence on actuator behaviour.

In order to train the modular map a representative data set must be collected. Such a data set consists of correlated samples of the above data sampled over the entire operational envelope of the actuator.

The modular map is trained on the entire set of input data, i.e. desired reponse in combination with environmental and operational parameters. This is done according to the methodology described in International Patent Application No WO 00/45333 which is incorporated herein by reference in its entirety. In the second part of the training phase, normally called "labelling", the data are presented to the network together with the corresponding output signal. In this part of the training process each processing element is associated with an appropriate value for the output signal.

Once the modular map has been trained and appropriate output data associated with the processing elements, it can be used for operation.

In the operational mode, a sequence of desired actuator responses is presented to the modular map processor together with the other operational parameters used in training the processor. Using the parallel processing capabilities of the modular map processor, the data can be processed at high speed, data rates of at least 1 MHz can be achieved, using conservative estimates of processor performance. This can be applied to any non-linear response for which appropriate training data can be obtained. The output of the modular map is the numerical value associated with the activated processing element. A typical control signal generated by using a modular map processor is included as FIG. 3.

In this way, an actuator with arbitrary non-linearities can be controlled in real time, with the only input being the instantaneous actuator demand together with a set of environmental and operational parameters. The choice of the additional parameters will typically be the lowest-dimensional set of parameters which adequately describes the non-linear characteristics of the actuator. A relevant example of an operational parameter can be the immediate history of actuator behaviour preceding the demand point. An example of an environmental parameter can be operating temperature. There is no requirement for the actuator movement pattern to be cyclical or set at any particular movement pattern, the only limitation is that the required operation has to be within the actuator's operational envelope and within the data set used for training the modular map.

It is necessary to monitor actuator performance and make the necessary adjustments to the input signal in a feedback loop. In many systems, there is considerable delay between the application of the control signal to the actuator and the corresponding actuator response. This time lag may be due to a variety of causes, such as signal propagation delays. In our example application, the time delay is on the order of 1–2 ms. A delay of this magnitude can cause problems with a conventional feedback loop. It is therefore necessary to evaluate the performance and apply corrections at some later stage.

In this document we will consider two different scenarios for delivering delayed feedback to the actuator controller. One is the situation where actuator operation is largely cyclical, with little or infrequent change from cycle to cycle.

Our example application falls within this category. The other scenario is where the actuator operation does not move in a cyclical or pseudo-cyclical pattern.

In order to evaluate the actuator performance, a quantitative method must be found to describe deviation from optimum performance. In the following, this will be called a "merit function".

A typical merit function can be built from one or more of the following types of component evaluation functions, each of them generating a numerical value characterising the actuator performance:

Deviations from desired operation timing
Deviation from desired position
Deviation from desired velocity
Deviation from the demand curve accumulated over the whole or parts of the demand curve.
Operation outside the safe operational range or operation which is close to the limits of the operational range In all of the above cases, the merit function components must be based on an understanding of the operational states of the actuator, and must be defined in each case. The modular map normally uses a vector of independent numerical values as its input, so the merit function can be built as a multi-dimensional vector using each component of the merit function as a vector element.

This instance of the modular map is trained on a representative set of merit functions generated from the system. This set of data can be the same dataset as the one used by the first instance of the modular map, but not necessarily. The map is labelled by using appropriate correction factors which are suitable for correcting the actuator behaviour.

The correction parameters are envisioned as being small in number, in our example application a possible set of parameters to be adjusted can consist of four data points, onset of movement, duration, and maximum amplitude and maximum amplitude timing.

In our example application, the actuator moves through a cyclical pattern, which does change over time, but in most cases is largely similar from cycle to cycle. In this case, the performance can be evaluated for each cycle, and suitable corrections are applied to the next cycle.

For a non-cyclical movement pattern, if direct feedback is not feasible, one possible feedback can be a linear adjustment to one of the input parameters, such as position, velocity or timing. Other feedback methods are also possible, depending on the application.

The application for which this invention was originally developed is the control of the inlet and exhaust cylinder valves for an internal combustion engine. Valves of this type are currently operated by means of a rotary mechanical camshaft, which allows no dynamic changes of the opening cycle. The main advantage of dynamically variable lift cycles is more efficient combustion with consequently lower emission rates and better fuel economy.

For a normal 4-stroke engine, the ignition cycle has a duration of two revolutions of the engine crankshaft. A valve opening profile is normally defined in terms of crankshaft angle, from 0° to 720°. A typical profile, showing valve lift as function of crankshaft angle is shown as FIG. 1.

The system on which the control system is currently being tested uses an electrohydraulic actuator for the valve. A largely similar control system can also be used for an electromechanical actuator, with appropriate training of the modular map response function.

From data acquired during actuator testing, an non-linear transfer function for one particular electrohydraulic actuator has been mapped—in this case in 3 dimensions for easier mapping. The plot shown in FIG. 2 displays actuator velocity as a function of actuator position and input control signal. For this particular actuator, the actuator velocity is approximately a linear function of the control signal, but as this diagram shows, it has significant non-linearities at some locations in the actuator operational space. Using the operational space mapped in FIG. 2, a modular map has been trained and used to generate appropriate control signals using desired actuator location and velocity as input parameters to the modular map. The output from the modular map is a control signal derived from the mapped non-linear function. Such a control signal is shown in FIG. 3.

For an operational system, two more operational parameters will be included in the mapping of the non-linear transfer function of the actuator. These are hydraulic pressure and the temperature of the hydraulic fluid.

A block diagram of the entire control system is included as FIG. 4.

Accordingly, there has been described the use of a hardware implementation of a modular map for controlling a mechanical actuator in real time.

The system includes the mapping of the actuator non-linear transfer function to the modular map and using the mapped non-linearities to generate a suitable control signal to the actuator for any required movement within the operational envelope of the actuator.

Further there is described the use of a second instance of a modular map for processing a merit function which is based on measured performance of the actuator and using the output from the second instance of the modular map for generating a feedback signal to the first instance of the modular map.

Specifically, the system has particular application in a control system using one or more modular maps for controlling an inlet or exhaust valve for a cylinder in an internal combustion engine, the valves being electrohydraulically or electromechanically controlled.

Modifications and improvements may be incorporated without departing from the scope of the invention.

What is claimed is:

1. A method of controlling a mechanical actuator comprising the steps of monitoring a plurality of parameters relating to a system associated with the actuator and using a modular map processor to control the actuator in response to the monitored parameters;

wherein a non-linear transfer function of the mechanical actuator is mapped to a first instance of a modular map, and the method further includes the steps of generating mapped non-linearities and using the mapped non-linearities to generate a first actuator control signal from the modular map to the mechanical actuator.

2. A method as claimed in claim 1, wherein a merit function is used to evaluate the performance of the mechanical actuator and the modular map processor controls the actuator in response to the evaluation.

3. A method of controlling a mechanical actuator comprising the steps of monitoring a plurality of parameters relating to the system associated with the actuator and using a modular map processor to control the actuator, wherein a merit function is used to evaluate the performance of the actuator and the merit function is mapped to a second instance of a modular map, generating a second feedback control signal which is passed to a first instance of the modular map, thereby creating a feedback loop.

4. A method as claimed in claim 1, wherein the modular map processor controls a mechanical actuator which forms at least part of an inlet or outlet valve for a cylinder in an internal combustion engine.

5. A method as claimed in claim 1, wherein the mechanical actuator is electrohydraulically or electromechanically controlled.

6. A method as claimed in claim 5, in which said parameters are selected from a group consisting of actuator position, actuator velocity, operation timing , temperature and pressure.

* * * * *